3,146,130
PROCESS FOR IMPREGNATING POROUS ELECTRODES, AND ELECTRODES PRODUCED THEREBY
Hanns H. Kroger and Hans-Hermann von Doehren, Frankfurt am Main, Germany, assignors to Varta Aktiengesellschaft, Frankfurt am Main, Germany
No Drawing. Filed Aug. 23, 1960, Ser. No. 51,251
Claims priority, application Germany Aug. 28, 1959
5 Claims. (Cl. 136—34)

This invention relates to galvanic battery cells such as storage battery cells, and more specifically to a process for impregnating with active material the porous electrodes, particularly sintered electrodes, of such cells, and provides a new electrode for such cells.

For affixing the active material upon porous electrode bodies, particularly sintered electrode grids, the so-called impregnation process has been used for a long time. In this process, the electrodes are impregnated repeatedly with solutions of simple metal salts, often at raised temperatures and under the action of a partial vacuum or of a super-atmospheric pressure; each separate impregnation being followed by a drying operation. The metal salt, having thus been firmly set, is converted into the respective metal oxide or hydroxide by a treatment with strong caustic alkali solutions into which the electrodes are dipped. The anions of organic or inorganic acids remaining in the active substance and the electrode grid must be removed without fail, as their presence would lead to serious trouble when the electrodes are put into use. For this reason the anions are removed as completely as possible either after each impregnation, or, at least, after the required amount of the active substance has been affixed to the electrode grid, either by a protracted washing with water or by electric polarization which itself requires much time and energy.

Attempts have also been made to apply to the electrode grid melts of the metal salts employed for the preparation of the active material. As compared with the conventional process, no substantial success could be made with this modification. Nor was it possible to subsequently remove the anions any more readily.

According to a more recent process the anions, which otherwise would interfere with the proper functioning of a storage battery, can be removed partly from the active material by a thermal treatment of the electrodes. In actual practice the very sharp delimitation of the individual operational steps is disadvantageously affected in view of time and temperature factors to be considered. This is particularly the case in the production of positive sintered electrodes, in which the formation of electrochemically inactive nickel oxide can in this mode of procedure be scarcely prevented. Furthermore, at the relatively high temperatures of the thermal treatment, the acid solutions used for the impregnation lead to a heavy corrosion of the electrode grid.

Thus, there arose the problem of obviating the aforementioned disadvantages, and of simplifying and accelerating the known impregnation method by increasing the concentration of the metal salts in the impregnating solution, as well as by using acid-free impregnating solutions, or such solutions as render it possible to remove anions readily and completely.

The solution of this problem is arrived at, in accordance with the invention, by impregnating the porous electrode grids with solutions prepared from metal compounds forming amine complexes, viz. ammonium complexes (the two terms being herein used interchangeably), either separately or mixed with each other, with ammonia, or with derivatives of ammonia such as the aliphatic or aromatic amines. Although various organic amines (including both aliphatic and aromatic amines) have been successfuly employed, we have obtained particularly satisfactory results by using methylamine, triethylamine, diethylenediamine, aniline, monomethylaniline, diethyleneaniline, to cite but a few. By means of this expedient it becomes possible to greatly increase the solubility of all metal salts used for the preparation of the active material, due to the mentioned complex formation. This advantage becomes evident particularly in the respect that by the aforesaid increase in solubility it is rendered possible to effect the required impregnations of the electrodes even at room temperature. In addition to this, it is also possible to use a smaller number of impregnations than in the older conventional practice, in order to affix a sufficient amount of the active substance to the electrodes. It is also clear that baths containing different metal ions dissolved therein can be used. Moreover, by operating in an alkaline medium there will be none of the deleterious action on the electrode grid, of the earlier conventional acid-reacting solutions.

Although one can quite generally use for this complex formation ammonia and its derivatives in any of the existing states of aggregation, in actual practice it has been found to be advantageous to use for the preparation of the impregnating solutions the ammonia and/or the ammonia derivatives in a dissolved state, for which purpose, for instance, water, organic liquids, or mixtures thereof can be used.

*Example No. 1.*—50 parts, by weight, of nickel nitrate-hexahydrate, are dissolved at room temperature in 100 parts, by weight, of an aqueous 25%-ammonia solution.

*Example No. 2.*—45 parts, by weight, of cadmium formate are dissolved at room temperature in 100 parts, by weight, of an aqueous 25%-ammonia solution.

Another advancement achieved by the process of the invention is due to the fact that the impregnating solutions are prepared in such a way that the oxides or hydroxides of all metals forming amino complexes are dissolved, whether individually or in mixtures with each other, in ammonia and/or ammonia derivatives or in solutions thereof, as the case may be. As the result of this improvement, the impregnating solutions cannot leave any residual acid behind in the active substance or in the interstices or vacuoles of the electrodes. Hence, by employing the present example, all the process steps heretofore required for the removal of the anions become unnecessary.

*Example No. 3.*—7 parts, by weight, of cadmium hydroxide are dissolved at room temperature in 100 parts, by weight, of an aqueous 37.5%-diethylenediamine solution.

*Example No. 4.*—10 parts, by weight, of zinc hydroxide are dissolved at room temperature in 100 parts, by weight, of a aqueous 25%-ammonia solution.

*Example No. 5.*—7 parts, by weight, of cadmium oxide and 5 parts, by weight, of glycocoll (glycine, aminoacetic acid) are dissolved in 100 parts, by weight, of water while heating to about 40° C.

Even in the case where the impregnating solution is prepared by dissolving salts of the aforesaid metals having organic or inorganic anions, in ammonia and/or ammonia derivatives, or solutions thereof, the substantial advance achieved, as compared to the heretofore disclosed processes, will be recognized first, as already mentioned, by the very considerable increase in solubility due to the formation of complexes, greatly simplifies the course of the impregnation step because of the possibility of operating at normal temperatures, second, by the fact that the electrodes do not have to be impregnated as frequently as heretofore, and third, in that the anions of organic or inorganic acids introduced into the electrochemically active composition through the ammonium complexes are readily convertible into an ammonium salt or into salts of the ammonia derivatives. In the subsequent steps of the impregnation process these salts have the great advantage that they can either be readily washed out, or thermally volatilized under favorable conditions (see Examples 1 and 2).

In extended investigations carried out with a view to further developing the process of the present invention, it was found to be highly advantageous to prepare the impregnating solutions by dissolving compounds of the above-mentioned metals in ammonia and/or ammonia derivatives, or in solutions thereof, as the case may be, with addition of ammonium salts. Found to be most suitable in this connection are those salts, such as ammonium carbonate, that are thermally highly unstable, hence preferably compounds obtainable from ammonia or derivatives thereof, and weak organic or inorganic acids.

*Example No. 6.*—90 parts, by weight, of nickel hydroxide and 10 parts, by weight, of cobalt hydroxide are dissolved at room temperature in 400 parts, by weight, of an aqueous 5%-ammonia solution, with addition of 150 parts, by weight, of ammonium carbonate.

*Example No. 7.*—20 parts, by weight, of silver (1) oxide are dissolved at room temperature in 100 parts, by weight, of an aqueous 25%-ammonia solution, with addition of 25 parts, by weight, of ammonium carbonate.

*Example No. 8.*—9 parts, by weight, of cobalt hydroxide are dissolved in 100 parts, by weight, of water, with addition of 7 parts, by weight, each of ammonium formate and hexamethylenetetramine, while heating to 40° C.

Of the abovementioned alternatives in the preparation of an impregnating solution in accordance with the invention, the combination process found to be particularly suitable is the one in which the oxide or hydroxide of one or several metals is dissolved, together with the added ammonium carbonate, in a solution of ammonia and/or ammonia derivatives. Any such impregnating solutions are particularly simple to handle, first, because they have a particularly high concentration of metal ions, and, second, because the added ammonium carbonate can be removed very readily in the further course of the process (see Examples 6 and 7).

In order to fully stress the importance of the advance achieved by this new process, several modes of procedure, some partly known, have been found to be especially advantageous. Thus with a view to utilizing as fully as possible the increase in solubility of the metal compounds due to the formation of amino complexes, it is very useful to employ for purposes of impregnation, their solutions at raised temperatures either under a normal or a super-atmospheric pressure. In another advantageous method the porous electrodes are impregnated with the amino complex solution, with the aid of a partial vacuum preferably at room temperature. According to an additional modification of the process the impregnation can be brought about particularly well by placing the electrode bodies in a closed container which is then evacuated, whereupon the impregnating solution is allowed to run into the container under the action of the external pressure, until pressure equalization has taken place.

For the further treatment of the impregnated electrodes up to final completion, various procedures are possible. Most simple is the treatment of those electrodes that have been impregnated with solutions containing no acid residues. In this case a supplementary drying treatment suffices to remove the ammonia and/or its derivatives in order to produce electrodes ready for use. In some cases a repetition of the impregnation step followed by a drying step, is advisable in order to affix a sufficiently large amount of the active material upon the electrodes, prior to carrying out the additional steps.

Electrodes that have been impregnated with a solution containing amino complexes of the oxides or hydroxides of metals and additional ammonium carbonate, likewise need to be dried only a relative time at sufficiently high tempertaures to render them ready for use. It is advisable, however, to treat the dried electrodes with hot water which quickly dissolves any ammonium salt still present. For practical reasons, in this case also, the impregnation is repeated as many times as required to cause the amount of the affixed active material to meet the requirements of practice.

In all those cases in which the impregnating solution contains anions of organic or inorganic acids, either of two methods is advisable in order to obtain electrodes which are ready for use. According to the first method, the impregnated electrodes are dipped into a hot caustic alkali solution, washed with hot water, and then dried at temperatures between 105° C. and 140° C., but preferably at 110° C.–120° C. Instead of using these relatively high drying temperatures the electrodes can also be dried at lower temperatures in a vacuum. By the second method for the production of completely finished electrodes, the impregnated electrodes are heated under a vacuum to temperatures at which the water and the ammonium salts are evaporated or volatilized, as the case may be, whereupon the residual anions and ammonium salts are removed by a treatment with a caustic alkali solution followed by a rinse with hot water, and the electrodes finally dried. Moreover, in accordance with the processes disclosed above, in every instance care should be taken to affix the required amount of the active material by a repetition of the impregnation operations.

The process of the present invention affords the following substantial advantages:

Due to the formation of amino complexes the solubility of simple metal compounds and metal salts is greatly increased. It thus becomes possible to impregnate with solutions at room temperature, and, in addition to this advantage, many fewer impregnations than have been customary heretofore are required to affix sufficient amounts of the active material to the electrode grids.

By using amino complex solutions there are obtained either anion-free impregnation baths or at least such solutions as permit of removing the anions completely under very favorable conditions in the further course of the process. Also, the alkaline medium prevents corrosion of the electrode grids.

For the formation of the amino complexes of the metal salts, salts of a metal with any desired anion can be used because, under the conditions of the invention process, the anions do not influence the solubility of the salt in the medium used as herein provided. It is, accordingly, no longer necessary to use such simple salts to produce good solubility characteristics.

The product of the invention is recognizable as such, as all the other impregnation processes practiced heretofore yield electrodes in which analytically determinable amounts of anions are still detectable even after greatly prolonged washing and rinsing treatments, and even after long periods of operation, whereas the electrodes made by the present process are substantially anion-free.

We claim:

1. In a process for forming porous electrodes for storage batteries in which a porous electrode is impregnated with electrochemically active material, the improvement which comprises impregnating the porous electrode with a solution containing an ammonium complex of a metal of the group consisting of nickel, cobalt, cadmium, zinc, silver, copper, and mercury, said ammonium complex having been prepared by dissolving a metallic compound which is a member of the group consisting of the oxides and hydroxides of nickel, cobalt, cadmium, zinc, silver, copper, and mercury, in a nitrogen containing solvent which is a member of the group consisting of aliphatic amines, aromatic amines, amino acids, and aqueous ammoniacal solutions of ammonia, at a temperature in excess of about 25° C., but below the temperature at which the ammonium complex of the metal undergoes decomposition, removing the electrode from the impregnating solution, and drying the electrode at a temperature sufficiently high to remove any ammonia and ammonia derivative present.

2. In a process for forming porous electrodes for storage batteries in which a porous electrode is impregnated with electrochemically active material, the improvement which comprises impregnating the porous electrode with a solution containing an ammonium complex of a metal of the group consisting of nickel, cobalt, cadmium, zinc, silver, copper, and mercury, said ammonium complex having been prepared by dissolving a metallic compound which is a member of the group consisting of nickel, cobalt, cadmium, zinc, silver, copper, and mercury compounds, in a nitrogen containing solvent which is a member of the group consisting of aliphatic amines, aromatic amines, amino acids, and aqueous ammoniacal solutions of ammonia, at a temperature in excess of about 25° C., but below the temperature at which the ammonium complex of the metal undergoes decomposition, removing the electrode from the impregnating solution, drying the electrode at a temperature sufficiently high to drive off water and ammonium salts, leaching the electrode in an aqueous solution of alkali, and washing the leached electrode with water to remove any residual anions and ammonium salts.

3. The process of claim 2 in which the step of drying the electrode is carried out under vacuum.

4. In a process for forming porous electrodes for storage batteries in which a porous electrode is impregnated with electrochemically active material, the improvement which comprises impregnating the porous electrode with a solution containing an ammonium complex of a metal of the group consisting of nickel, cobalt, cadmium, zinc, silver, copper, and mercury, said ammonium complex having been prepared by dissolving a metallic compound which is a member of the group consisting of nickel, cobalt, cadmium, zinc, silver, copper, and mercury compounds, in a nitrogen containing solvent which is a member of the group consisting of aliphatic amines, aromatic amines, amino acids, and aqueous ammoniacal solutions of ammonia, at a temperature in excess of about 25° C., but below the temperature at which the ammonium complex of the metal undergoes decomposition, removing the electrode from the impregnating solution, leaching the electrode in an aqueous solution of alkali, washing the leached electrode with water, and then drying the washed electrode at a temperature in the range between about 105° C. and 140° C.

5. In a process for forming porous electrodes for storage batteries in which a porous electrode is impregnated with electrochemically active material, the improvement which comprises impregnating the porous electrode with a solution containing an ammonium complex of a metal of the group consisting of nickel, cobalt, cadmium, zinc, silver, copper, and mercury, said ammonium complex having been prepared by dissolving a metallic compound which is a member of the group consisting of nickel, cobalt, cadmium, zinc, silver, copper, and mercury compounds, in a nitrogen containing solvent which is a member of the group consisting of aliphatic amines, aromatic amines, amino acids, and aqueous ammoniacal solutions of ammonia, at a temperature in excess of about 25° C., but below the temperature at which the ammonium complex of the metal undergoes decomposition, removing the electrode from the impregnating solution, drying the electrode by heating it to a temperature sufficient to drive off water and ammonium salts and to dry the electrode, and said steps of impregnating and heating are subsequently repeated until the electrode has accumulated the required amount of active material, and then leaching the impregnated electrode in a hot aqueous solution of sodium hydroxide, washing the leached electrode with hot water to remove residual anions and ammonium salts, and then heating the washed electrode at a temperature in the range between 105° C. and 140° C. to dry it.

References Cited in the file of this patent

UNITED STATES PATENTS

| | | |
|---|---|---|
| 1,442,238 | Smith | Jan. 16, 1923 |
| 2,672,494 | Fleischer | Mar. 16, 1954 |
| 2,737,541 | Coolidge | Mar. 6, 1956 |
| 2,880,257 | Murphy | Mar. 31, 1959 |
| 2,969,413 | Peters | Jan. 24, 1961 |

OTHER REFERENCES

Vinal: Storage Batteries, 1955, 4th edition.

Handbook of Chemistry and Physics, 1956, 38th edition, page 558, Number 14.

Mellor: Inorganic and Theoretical Chemistry, volume 15, 1936, pages 383 and 384.